Aug. 7, 1945.   R. C. LANG   2,381,502
COATING MACHINE
Filed July 9, 1940   11 Sheets-Sheet 3

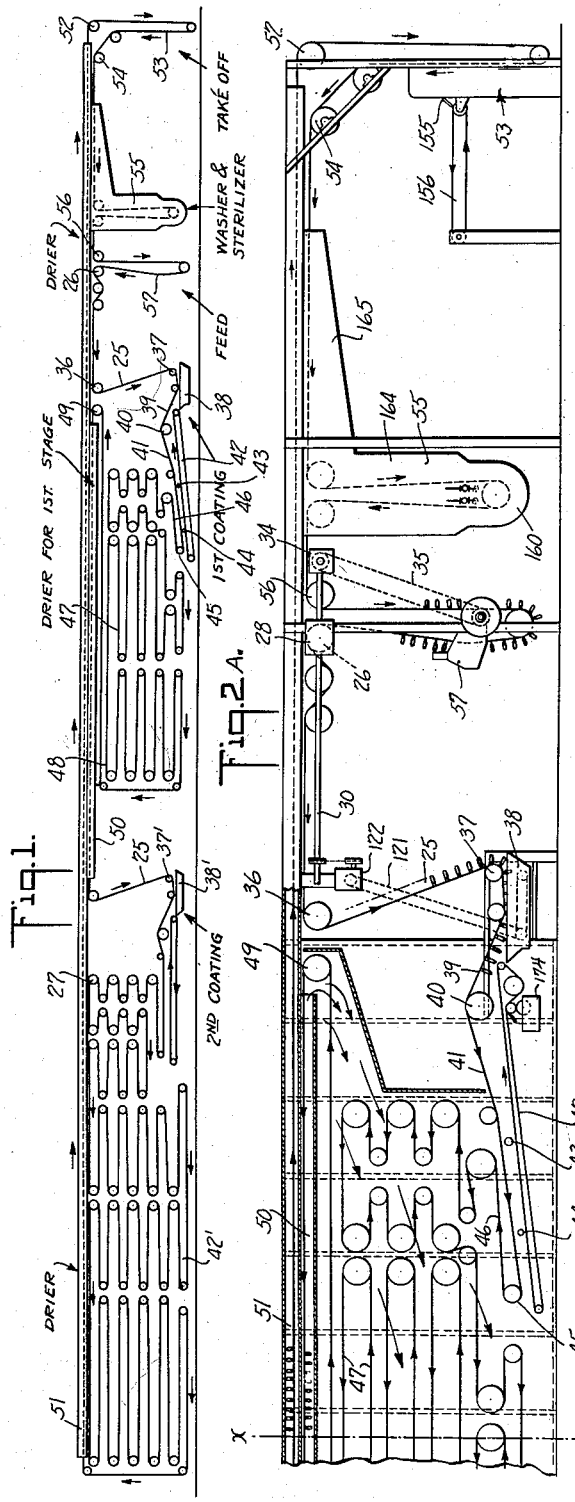

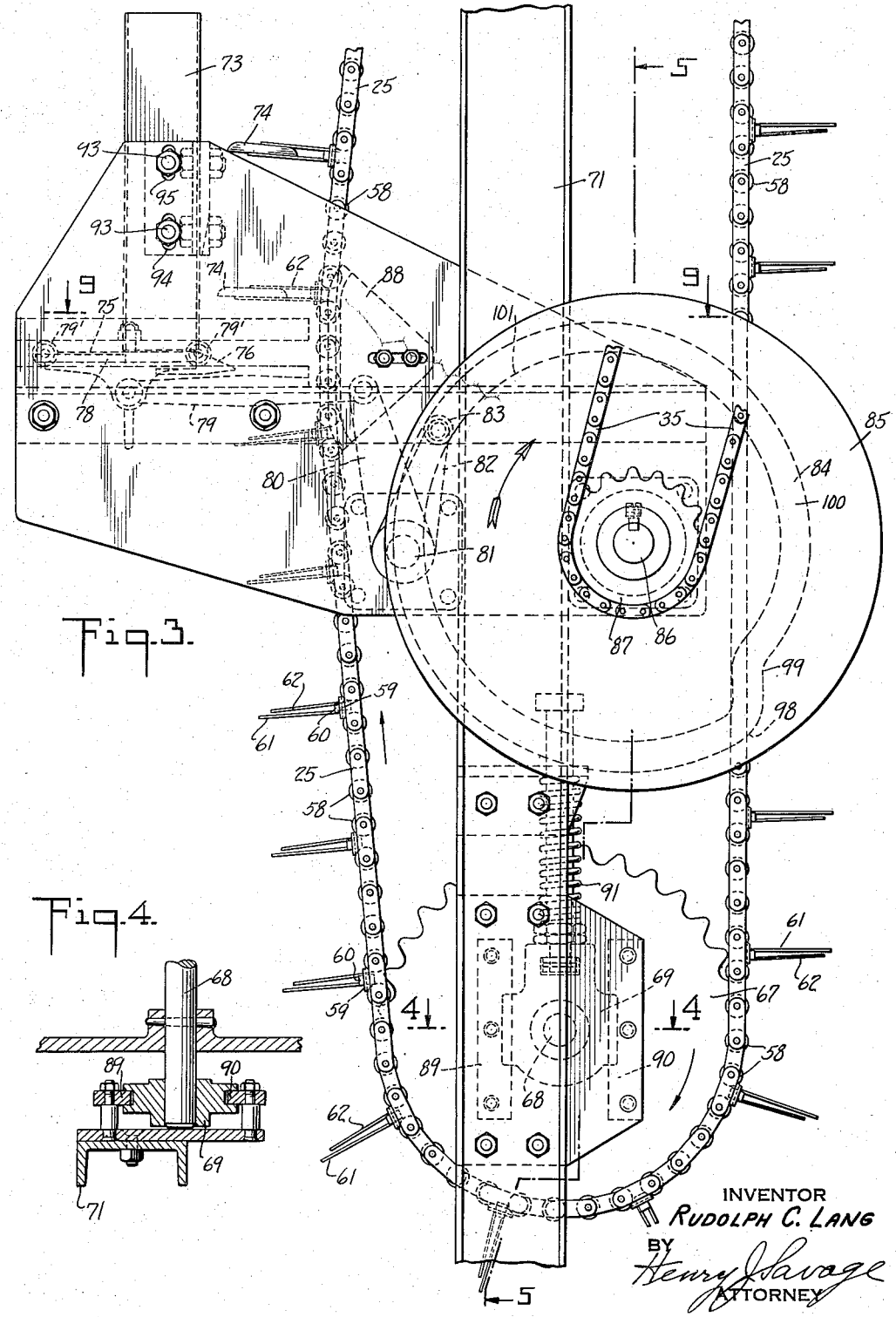

INVENTOR
RUDOLPH C. LANG
BY
Henry Savage
ATTORNEY

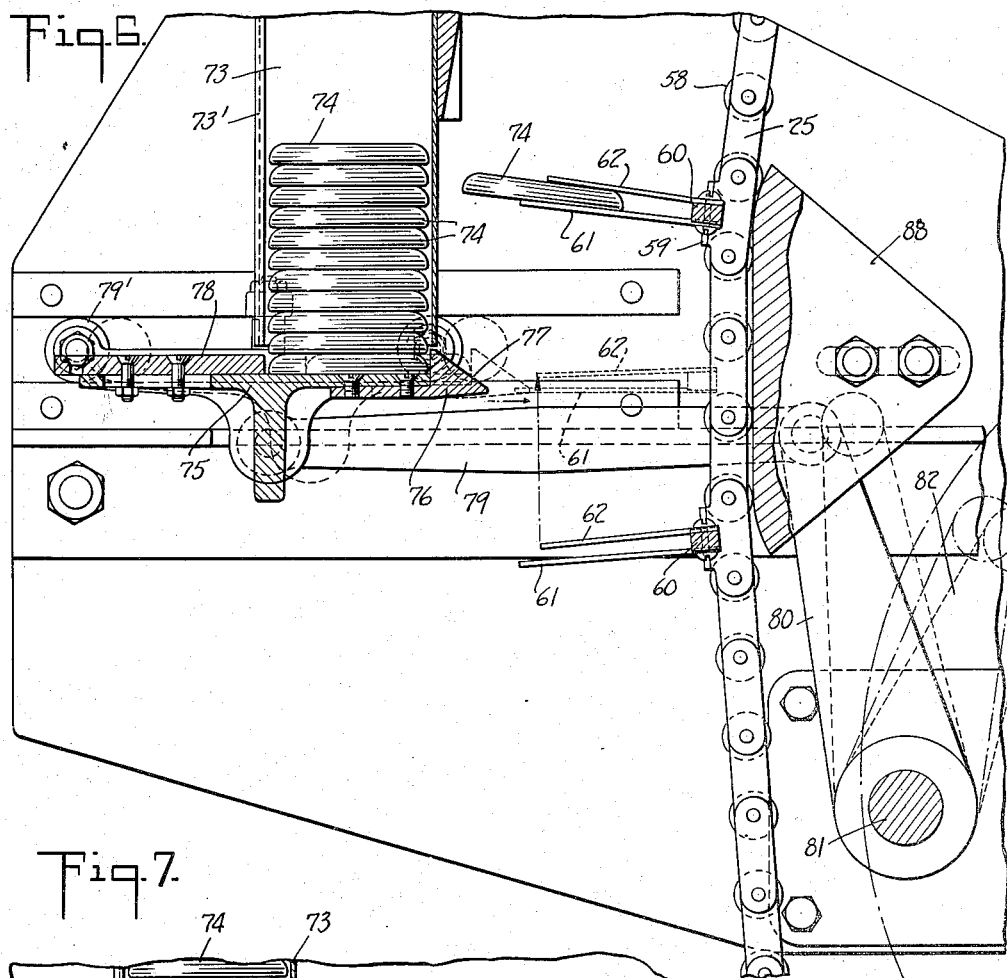
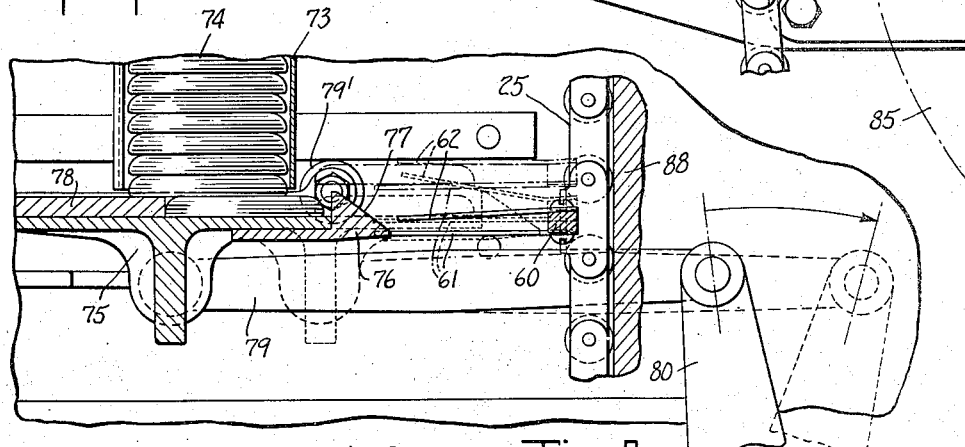
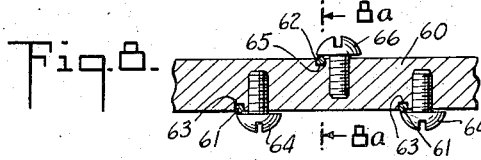
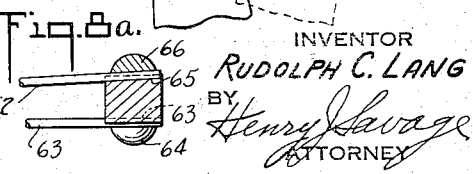

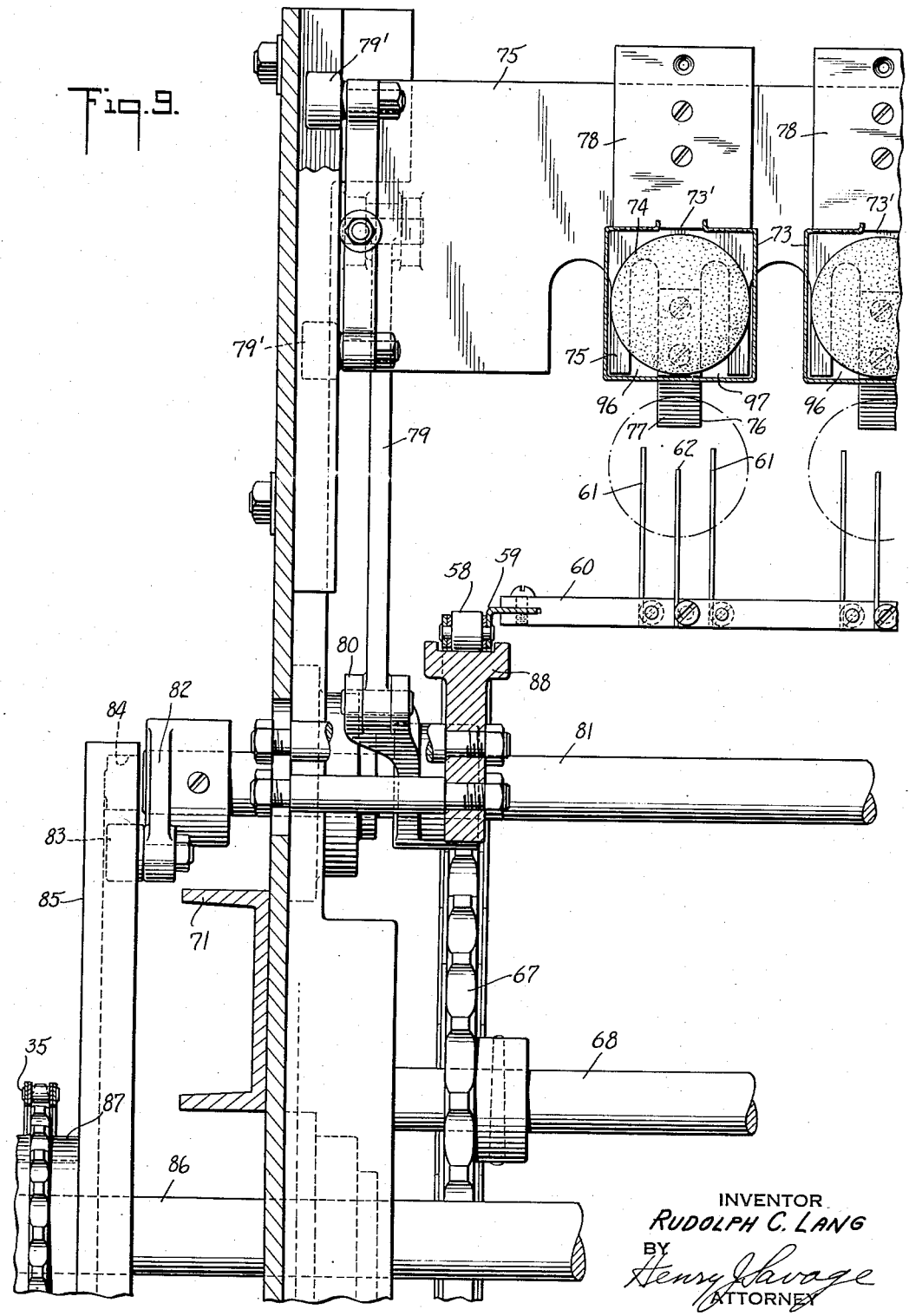

Aug. 7, 1945.    R. C. LANG    2,381,502
COATING MACHINE
Filed July 9, 1940    11 Sheets-Sheet 6
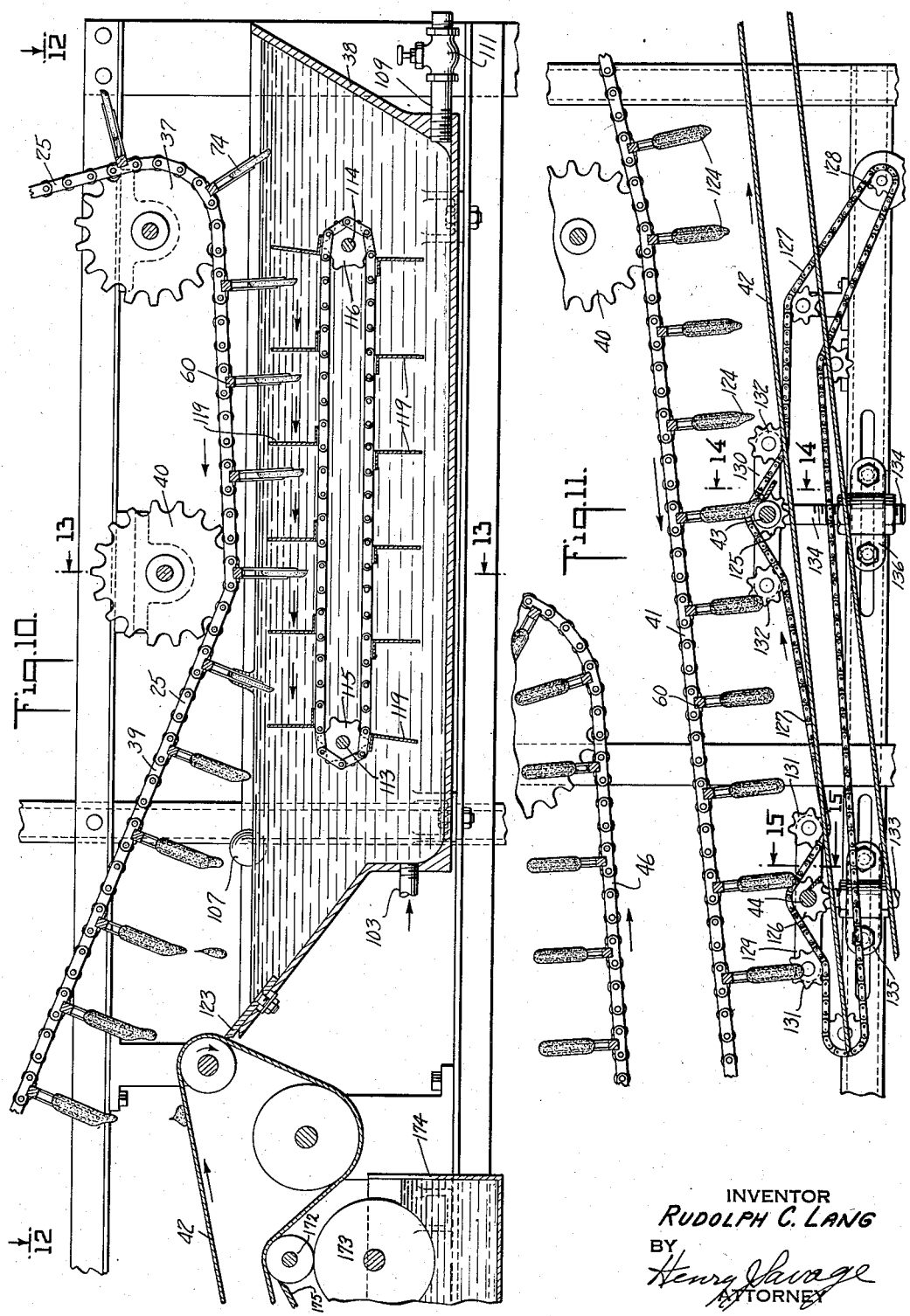
INVENTOR
RUDOLPH C. LANG
BY
Henry Savage
ATTORNEY Aug. 7, 1945.  R. C. LANG  2,381,502
COATING MACHINE
Filed July 9, 1940  11 Sheets-Sheet 7

INVENTOR
RUDOLPH C. LANG
BY
Henry J Savage
ATTORNEY

Aug. 7, 1945. R. C. LANG 2,381,502
COATING MACHINE
Filed July 9, 1940 11 Sheets-Sheet 8
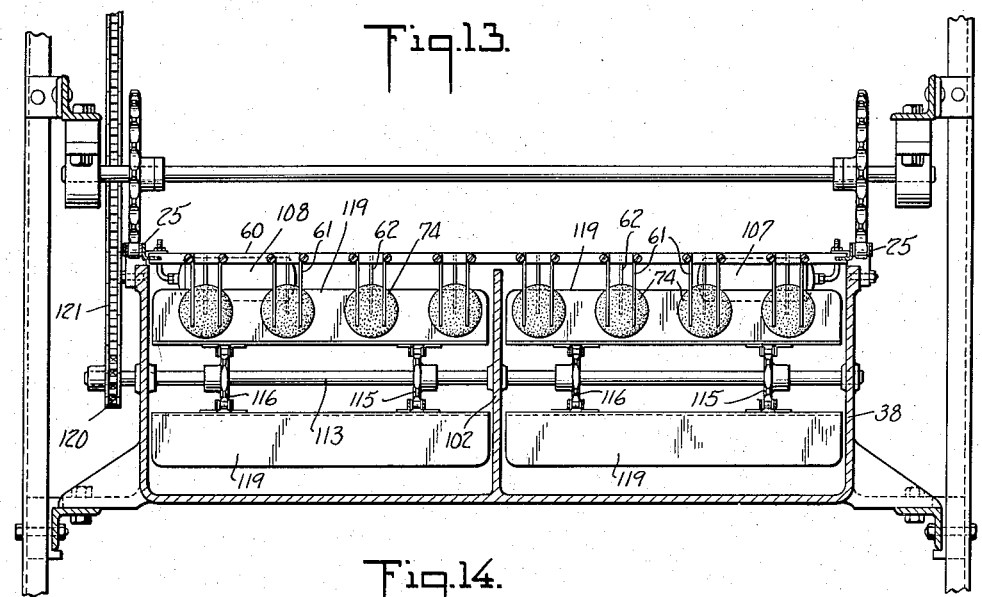
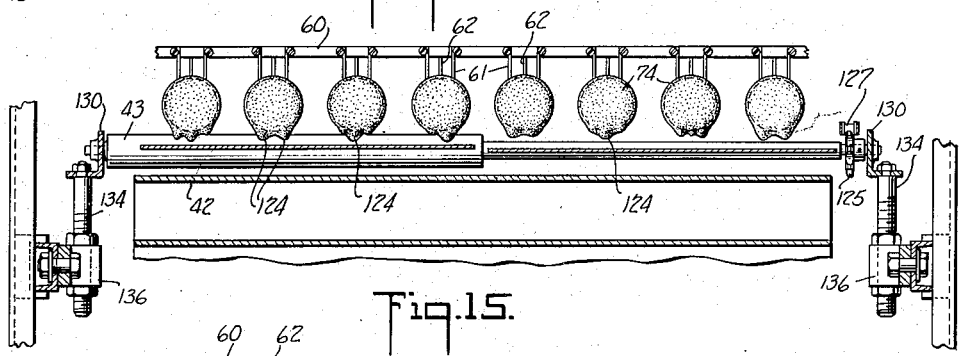
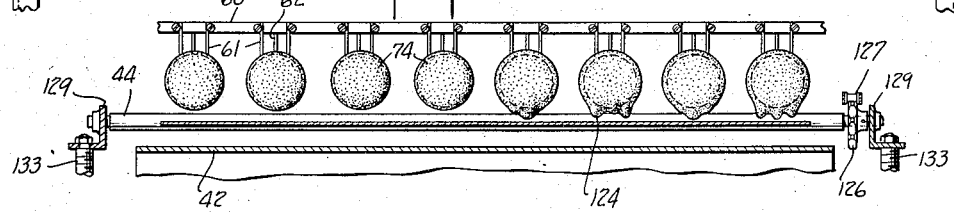
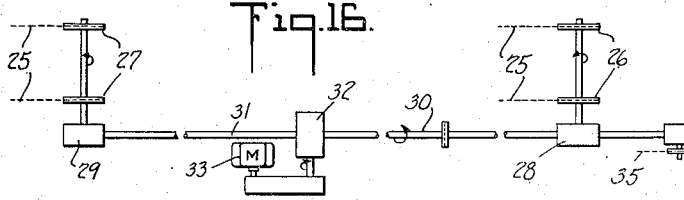
INVENTOR
RUDOLPH C. LANG
BY
Henry Savage
ATTORNEY

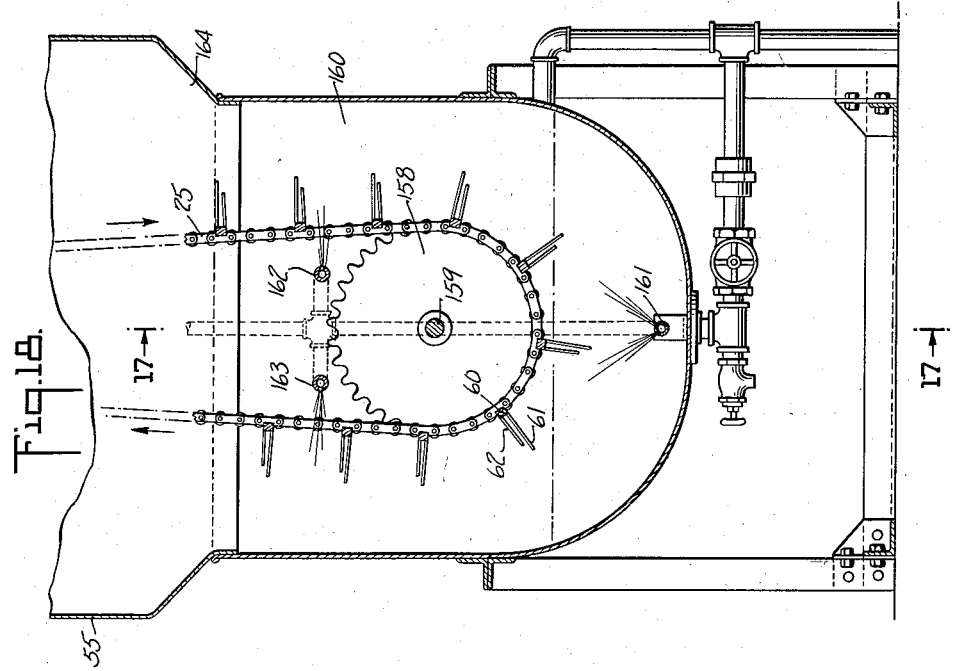
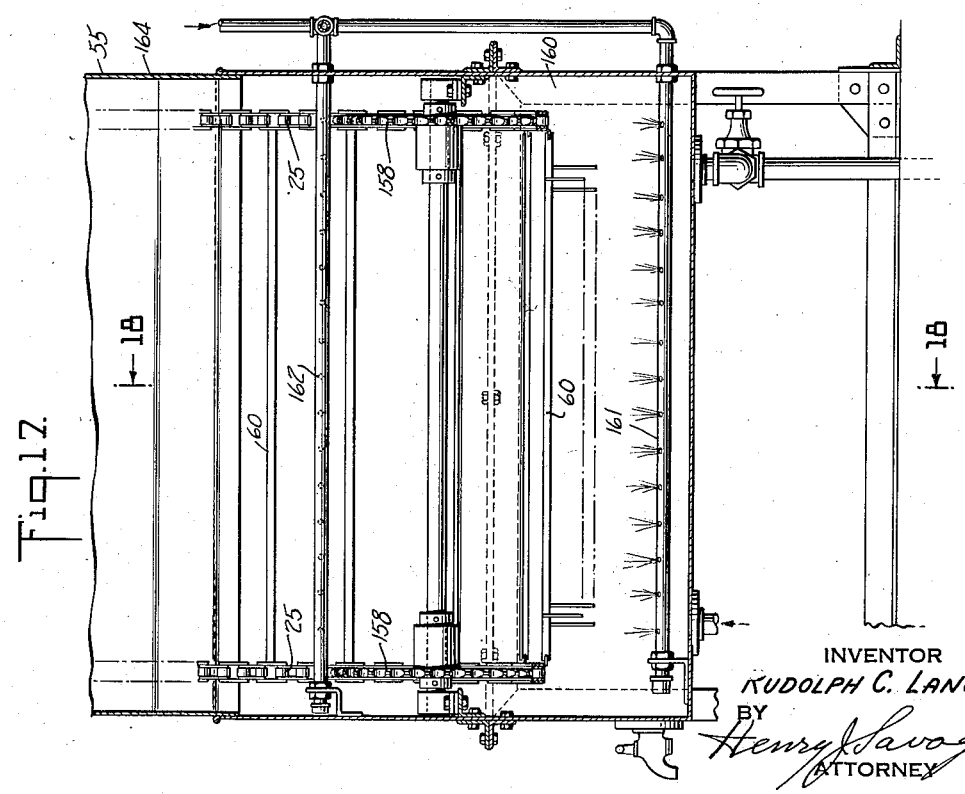

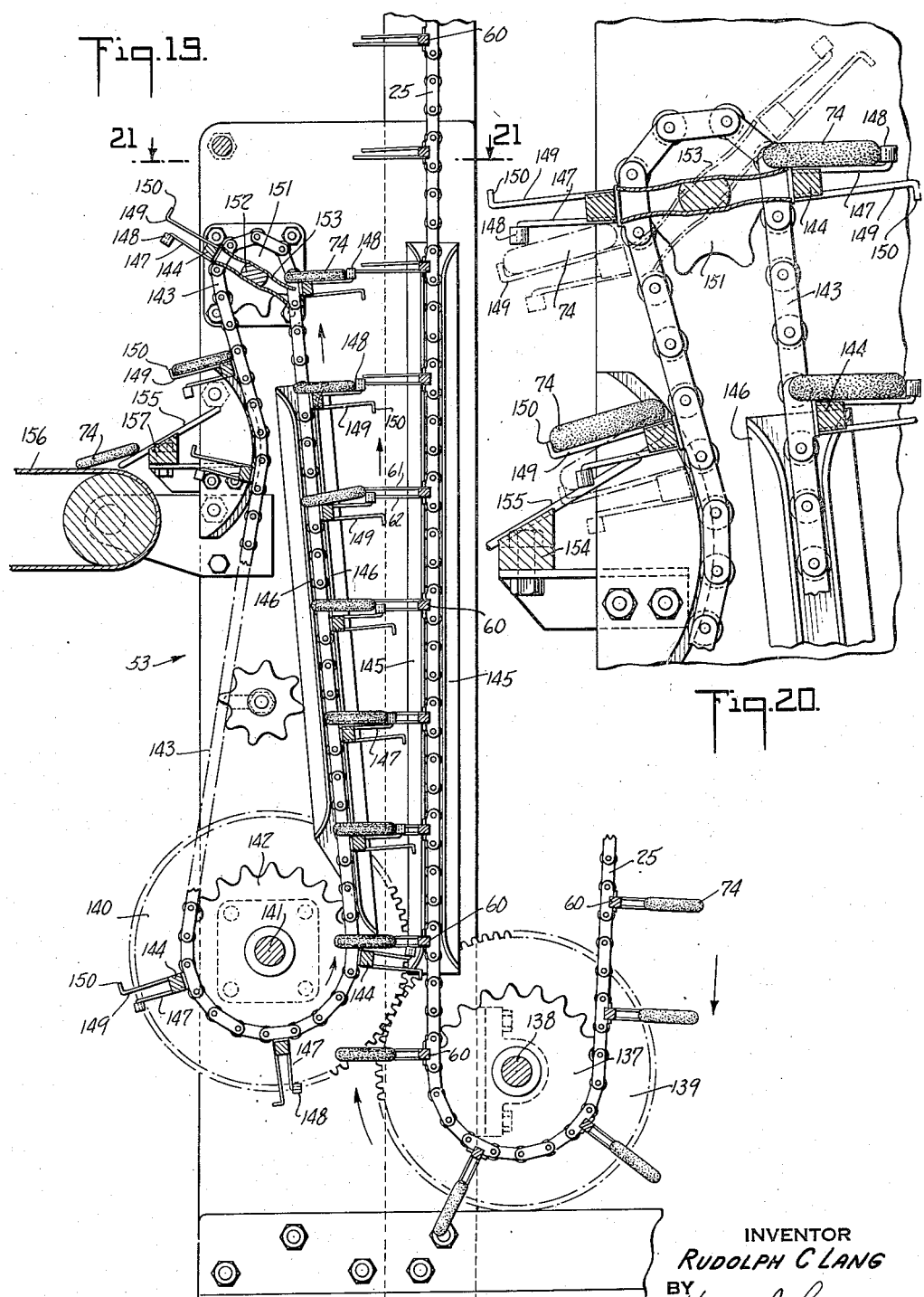

Aug. 7, 1945.  R. C. LANG  2,381,502
COATING MACHINE
Filed July 9, 1940  11 Sheets-Sheet 11
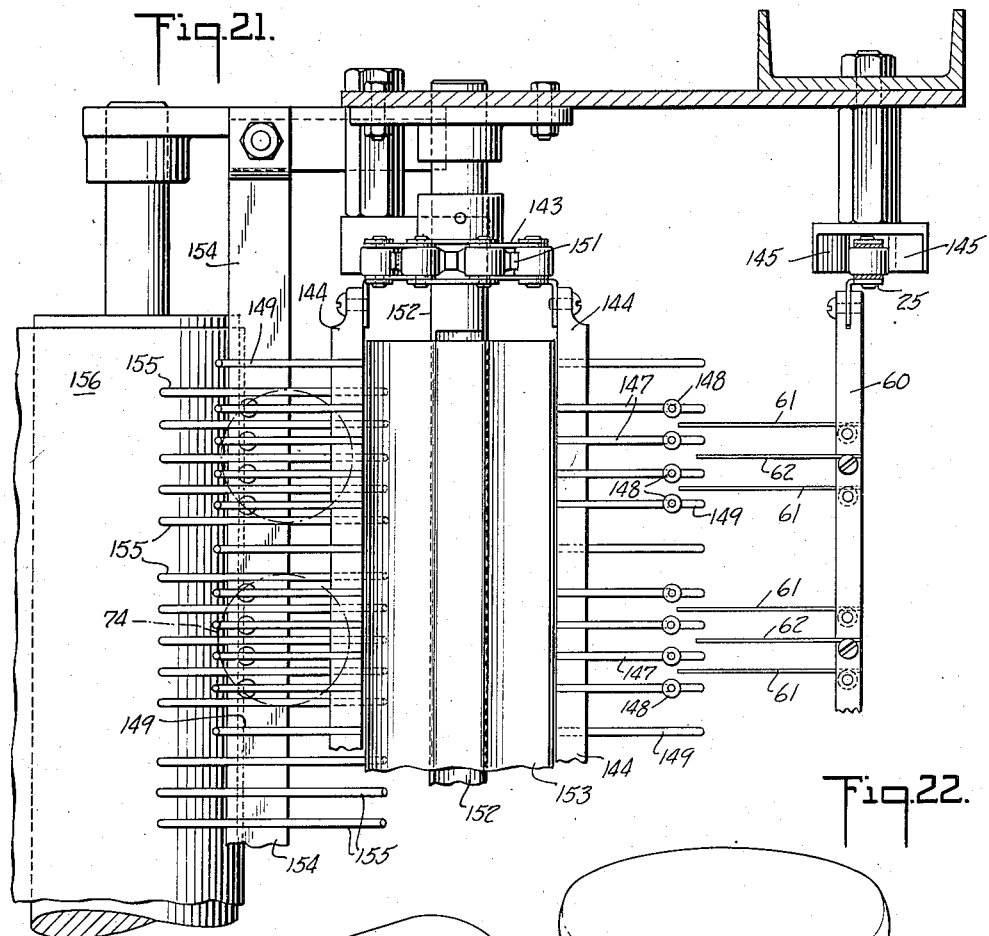
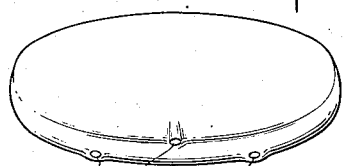
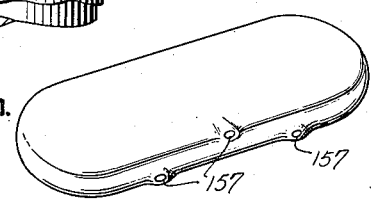
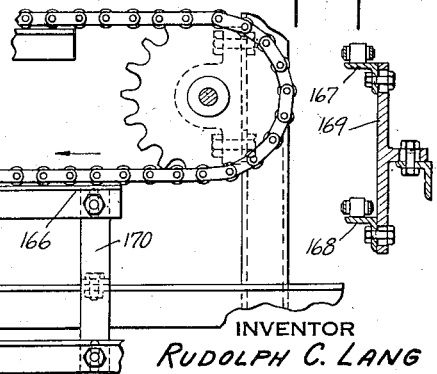
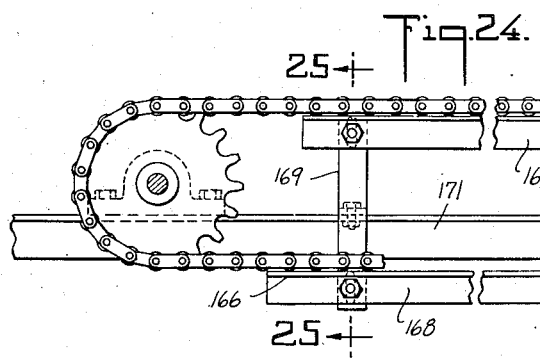
INVENTOR
RUDOLPH C. LANG
BY
Henry Savage
ATTORNEY Patented Aug. 7, 1945

2,381,502

UNITED STATES PATENT OFFICE 2,381,502

COATING MACHINE

Rudolph C. Lang, New York, N. Y., assignor to National Biscuit Company, New York, N. Y., a corporation of New Jersey Application July 9, 1940, Serial No. 344,548

30 Claims. (Cl. 91—2)

My invention pertains to coating machines and is designed particularly for icing biscuit, cakes, and the like, but is equally adapted for applying a coating of lacquer, enamel or other coating material to a wide variety of articles.

Heretofore, small biscuit and cakes have been iced by first impaling the cakes on pins secured to a bar. These bars usually are from two to three feet in length and each bar has a number of pairs of pins projecting from each side on which the biscuit are impaled by hand. When a biscuit is placed on each pair of pins, the pins and biscuit are dipped by the operator in the coating or icing and then hung on a long conveyor chain which travels very slowly, back and forth, until the icing has hardened, usually two to three hours or longer. The icing tends to run to the lower edges of the biscuit, which necessitates that the bars be reversed by the operator at the proper time in order to keep the coating of even approximately uniform thickness and prevent its forming "tails" or small knobs along one edge of the biscuit. Dipping racks or bars having opposite pairs of pins of the type commonly used are shown in the patent to Collis; No. 1,130,376. This former means and method of icing cakes has many objections that are overcome by the present invention, among which are the breaking of cookies or biscuit when inserting them on the pins, the loss of cakes due to their falling off from the pins while being dipped, hand labor in pinning the biscuit and dipping them, hand labor in turning the bars while the icing is drying, uneven thickness of the icing which increases the drying time sufficient for the greatest thickness of icing, large holes in the icing caused by its breaking away when the pins are removed, and loss of icing which adheres to the dipped pins, and many other objections and disadvantages.

Not only does my invention overcome all of the above noted objections, but it has many other advantages that will be apparent to those skilled in this art and need not be pointed out in detail.

Reference will be had now to the drawings in which I have shown my invention embodied in a biscuit icing machine.

Fig. 1 is a side elevation, largely diagrammatic, of a complete automatic icing machine.

Fig. 2A is an enlarged side elevation of the right hand end of Fig. 1, parts being illustrated diagrammatically.

Fig. 2B is an enlarged side elevation of the left hand end of Fig. 1.

Fig. 3 is a side elevation, on a larger scale, of the means for automatically feeding the biscuit to the carrier chains or trolleys.

Fig. 4 is a section on line 4—4 of Fig. 3, showing the floating bearing for the lower loop of the chain.

Fig. 6 is a sectional view of the biscuit feeding means, the section being taken on the line 6—6 of Fig. 5.

Fig. 7 is a fragmentary view of part of Fig. 6 with the feed mechanism slightly advanced.

Fig. 8 is a section of one of the icing bars or racks, showing how the biscuit holding prongs or pins are secured to the bar.

Fig. 8A is a section on the line 8A—8A of Fig. 8.

Fig. 9 is a plan view, partly in section, of the feeding means, taken on line 9—9 of Figs. 3 and 5.

Fig. 10 is a section through the icing or dipping tank, the section being taken substantially on line 10—10 of Fig. 12.

Fig. 11 is a side elevation of the means for de-tailing or removing excess icing from the lower edge of the cakes.

Fig. 13 is a cross section of the icing tank, taken on line 13—13 of Figs. 10 and 12.

Figure 5:
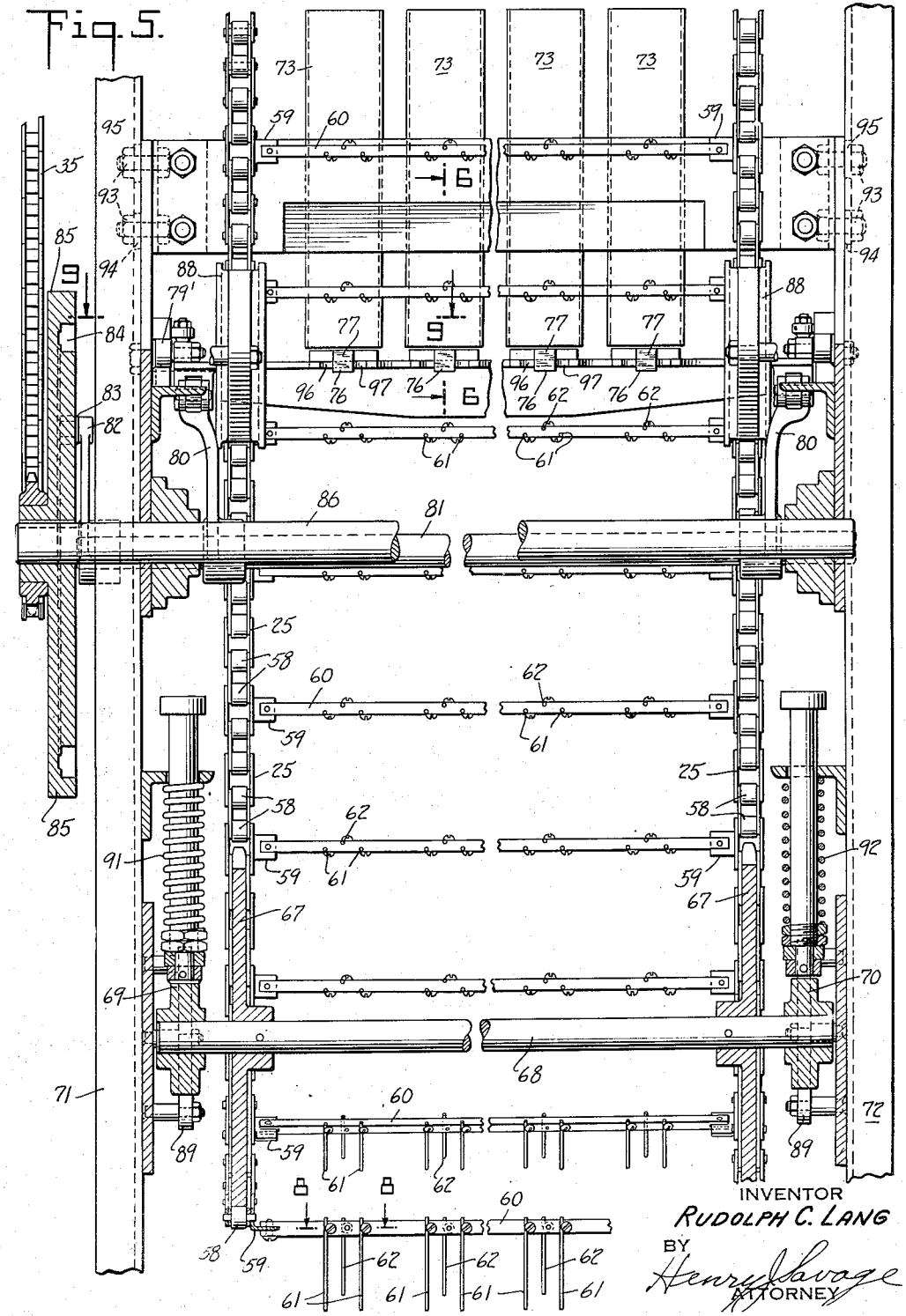
Fig. 5 is a section substantially on the line 5—5 of Fig. 3.

Figs. 14 and 15 are detail views, taken on the lines 14—14 and 15—15 of the Fig. 11.

Fig. 16 is a diagram of the power drive.

Fig. 17 is a section taken on line 17—17 of Fig. 18 of the steam washing and sterilizing tank for the icing bars.

Fig. 18 is a section on line 18—18 of Fig. 17.

Fig. 19 is an enlarged vertical sectional view of the take-off or unloader that is shown diagrammatically at the extreme right of Figs. 1 and 2A.

Fig. 20 is an enlarged view of the rotatable transfer chute of Fig. 19.

Fig. 21 is a horizontal section of the unloader, taken on line 21—21 of Fig. 19.

Figs. 22 and 23 are perspective views of typical round and oval biscuit that have been iced on the present invention.

Fig. 24 is a detail view of the adjustable guide bars or tracks for supporting the carrier chains or trolleys between sprockets.

Fig. 25 is a section on line 25—25 of Fig. 24.

I will refer first to Figs. 1, 2A and 2B in which I have illustrated diagrammatically one form of my invention embodied in a biscuit icing machine. This machine consists essentially of an endless carrier comprising two parallel chains which are driven continuously and pass over a number of sprockets which divide the chains into a number of horizontal and vertical runs. These chains have a number of parallel icing bars or article holding bars and in the embodiment of the invention illustrated, the chains carry about 2400 of these bars and take from 2 to 4 hours to make a complete circuit. Each bar is fixed at its two ends to the respective chains and has a number of laterally projecting fingers or pins that are adapted to hold the articles that are to be iced or coated. These pins are fixed to the bars which in turn are fixed to links of the chains so that as the chains pass around the sprockets, the fingers will point down on what I will call the lower horizontal runs of the chains and will point vertically upward on those horizontal runs of the chain which I will call the upper horizontal runs. On the vertical runs of the chain, these fingers will point horizontally to one side or the other depending upon the direction of the run of the chain.

The articles held by the fingers, at one point in the travel of the chains, dip into a tank which holds the coating material. This coats the articles with the liquid coating material and as the chains continue their travel, the articles are lifted from the tank, and the coating material being liquid tends to flow down and collect at the bottom edges of the articles which are held by the fingers with their lower edges in horizontal planes on the horizontal runs of the chains. A short distance beyond the dipping tank, the distance depending upon the viscosity and rapidity with which the coating material sets, I provide wiping rollers in the path of the articles which are adapted to wipe off the excess coating material that has collected along their bottom edges. This wiping action takes place on a run of the chain where the fingers are pointing down. The chains then pass around sprockets which turn the fingers up so that the coating material tends to flow back over the articles. The sprockets are then arranged so that the position of the fingers are reversed at frequent intervals which insures an even spreading of the coating over the biscuit. The first horizontal runs of the chains, after the biscuit have been coated and while the coating material is sufficiently fluid to flow readily, are comparatively short, the lengths of the runs increasing as the viscosity of the material increases. The chain is then passed through a number of horizontal runs so that the coating material sets and during this time, a current of air, properly conditioned, is caused to flow over the articles to set or harden the coating material more quickly. When coating biscuit, it is usually necessary to provide two or more coats of the icing material, which may be of the same or different kinds. After the first coating has hardened, the chains pass over a second coating or dipping tank in which the articles are again immersed to give them a second coat of icing. The excess material is wiped off after the second dipping and the chains carried through another series of horizontal runs through a chamber in which a current of properly conditioned air is maintained until the second coat of icing is hardened. This process of dipping, wiping and hardening is repeated for each coat. The chains carrying the biscuit in the last stage of hardening pass through a long horizontal cooling or hardening tunnel extending the full length at the top of the machine through which a current of air is maintained and at the exit end the chains pass over sprockets and down on a vertical run to a take-off station where the iced biscuit may be removed either by hand or by an automatic take-off. The chains then pass up carrying the empty pins and then across into a washer and sterilizer containing hot water and steam jets which thoroughly clean off the icing that may adhere to the pins and sterilizes them. The chains then pass on over another pair of sprockets and down on a vertical run and up on a second vertical run past a feeding or loading device where biscuit are automatically inserted on the fingers carried by the chains. The chains then pass on and down over the first dipping tank where the biscuit are dipped as previously described.

Referring again to Figs. 1, 2A and 2B, 25 indicates the endless chains carrying the icing bars which are driven continuously from pairs of sprockets 26 and 27 which are driven through transmission gearing 28, 29 through the differential shafts 30, 31 extending from opposite sides of the differential 32 that is driven by an electrical motor or other source of power 33 as is shown diagrammatically in Fig. 16 and illustrated in part on Fig. 2A. The differential shaft 30 extends to the right in Figs. 2A and 16 beyond the transmission 28 and through a transmission 34 drives a chain 35 leading to the biscuit feeding or loading device.

From the driving sprockets 26, the chains pass in a horizontal run to a pair of sprockets 36 and then down over a pair of sprockets 37, just over and adjacent one end of the dipping tank 38. This tank is kept filled with the coating material and as the chains pass over it the articles are dipped into the coating material and then lifted out as the chain travels up on the short inclined run 39, thence over the sprockets 40 and onto a substantially horizontal run 41 where the biscuit carrying fingers are pointed down and excess coating material drips off onto the upper run of an apron 42 which carries the excess coating material that drips off back into the dipping tank 38. At a suitable point on this run 41, indicated at 43 or 44 in Figs. 1 and 2A, wiping rollers are located which wipe off the excess coating material which by that time is collected in knobs or tails on the lower edges of the biscuit and delivers it to the conveyor 42. The chains then pass around sprockets 45 which reverses the positions of the pins so that on the run 46 the pins point up and the coating material tends to flow downward and spread evenly over the biscuit. The chains carrying the biscuit then pass through a number of upper and lower horizontal runs as illustrated in Figs. 1 and 2A which continually reverse the position of the biscuit to insure the icing being distributed in an even coat until the icing eventually is sufficiently set that the lengths of the runs can be increased as indicated at 47 and 48. The top run of the chain in this section passes back to a sprocket 49 from which the chains pass on a relatively long horizontal run through a hardening passage or tunnel 50 through which a current of air is forced in the opposite direction to the travel of the chains. Upon leaving this hardening tunnel 50 the chains pass down on a vertical run to a pair of sprockets 37' adjacent the second dipping tank 38' in which the biscuit are dipped to receive their second coat of icing. From this second dipping tank the chains carrying the dipped articles pass over a second apron 42', which returns the excess icing to the tank 38', and over de-tailing rollers 43' and 44' the same as when first dipped. The chains then pass along further series of upper and lower horizontal runs over which a current of air is maintained until at the end, the chains pass into a long cooling tunnel 51 which extends the full length of the machine and through which a current of air is maintained flowing counter to the direction of the chain. At the exit end of the tunnel, the chains pass over sprockets 52 and extend down to a take-off or unloading station indicated generally at 53. From the unloading station, the chains pass upwardly and over sprockets 54 and then horizontally to the washer and sterilizer 55. From the sterilizer, the chains pass over sprockets 56 and down to the feeding or loading device 57. From the loading device, the chains pass upwardly and over the driving sprocket 26.

*Feeding or loading mechanism*

As best shown in Figs. 3, 5 and 6, the chains 25 have rollers 58 on the pins connecting the links and every fourth link is provided with a lug or ear 59 to which the icing bars 60 are connected. The articles are held on the icing bars by laterally projecting sets of pins or fingers, each set comprising three fingers of which two are longer than the third, the two fingers 61 being on one side of the bar and the shorter finger 62 being on the opposite side of the bar midway between the two longer fingers. These fingers or pins may be secured to the bar in any desired manner but preferably by securing them in tight fitting slots milled across opposite sides of the bars which I show as rectangular in cross section. The preferred method of securing these pins is best shown in Figs. 6 and 8. Parallel slots 63 are milled across one face of the bar to receive the pins 61 which fit snugly therein. The pins are locked in by screws 64. A slot 65 is milled in the opposite face of the bar to receive the shorter pin 62. As best shown in Fig. 6, the slot 65 inclines slightly so that the free end of the pin 62 converges toward the pins 61. The pin 62 likewise is locked to the bar by a screw 66.

At the loading station, the downward runs of the chains pass around sprockets 67 which are keyed to a shaft 68 that is mounted in yieldable bearings 69, 70 on the fixed frame members 71, 72 of the machine. On the upward run of the chains from the sprocket 67, the fingers 61, 62 extend outwardly and pass adjacent holders or chutes 73, one adjacent each set of pins carried by the respective bars, from which the articles are automatically inserted between the pins of each set. As shown in Figs. 6 and 7, each of the chutes 73 holds a vertical stack of the biscuit or cakes 74 that are to be iced. The chutes have open slots 73' on their rear sides to give access to the chutes for stacking the biscuit 74 therein. The chutes also are open at their lower ends and a sliding head 75 is mounted to reciprocate below these open ends toward and from the fingers as they pass adjacent thereto. At its forward end this sliding head carries a spreader 76 for each chute having an upward inclined face 77 which is adapted to engage and spring upwardly the single prong 62 of each set of pins that are alinged with it on successive bars. Near its rear side, the sliding head carries a pusher plate 78, one for each chute, which is shown slightly less in thickness than the biscuit 74. The pusher 78 is adjustable on the sliding head so that the space between the pusher and the inclined nose of the spreader will freely receive the lower biscuit in the stack 74. Each end of the sliding head is supported on rollers 79' (Fig. 9) and is connected to one end of a link 79, the opposite ends of which are connected to rocker arms 80 keyed to a rock shaft 81 which in turn has an arm 82 on the free end of which there is a roller 83 running in the groove 84 of a cam 85 that is keyed to a shaft 86 carrying a sprocket 87 driven from the chain 35 (Figs. 5 and 9). At the point opposite where the biscuit are fed to the pins, the rollers 58 run on vertical adjustable tracks or guides 88 which determine the distance at which the ends of the pins pass the chutes 73. For larger biscuit the ends of the pins will be further from the chutes and for smaller biscuit they must be closer so that the biscuit will be inserted the proper distance between the pins. The stroke of the sliding head 75, spreader 76 and pusher 78 is fixed in length and variations in the sizes of the articles to be coated are taken care of by adjusting the tracks 88 so that the chain will run closer to or farther from the loading chutes, as may be required.

The shaft 68 supporting the sprocket 67 is yieldably mounted so as to compensate for the slight difference in the length of the run of the chain corresponding to adjustments of the guides or tracks 88.

As best shown in Figs. 3, 4 and 5, the bearings 69, 70 are mounted on vertical slides 89, 90 and are yieldably held down by springs 91, 92 which keep the chain tight but can yield to compensate for adjustment of the guides 88.

Referring to Figs. 3, 6 and 7, the chutes or holders 73 are vertically adjustable with respect to the sliding head 75. The chutes may be adjusted by means of the bolts 93 which are secured to the respective chutes and extend through slots 94, 95 in the frame. The lower ends of the chutes are adjusted at such distance from the sliding head 75 that the pusher 78 can pass beneath the lower end of a chute and carry a biscuit 74 with it but the space is not large enough to permit two biscuit to be pushed out. On reference to Fig. 5, it will be seen that the spreaders 76 are in alignment with the short pins 62 and that they are sufficiently narrow to pass between the two pins 61 of each set. This is also clearly shown in Fig. 9 and each of the slides 75 has two slots 96, 97 in alignment with the two long pins 61 and through which the latter are adapted to pass when the slide is at the end of its forward or delivery stroke, as shown in dotted lines in Fig. 7.

The operation of the feeding or loading device is as follows: The chain carrying the fingers up in Fig. 6 is driven continuously. The set of fingers 61, 62 just below the feeding device is empty while the set of fingers just above the feeding device is shown as having received one of the biscuit 74. With the parts as shown in Fig. 6 and the chain 25 moving upwardly, the sliding head 75 remains stationary until the set of fingers that is shown in full lines just below it gets nearly up to the dotted line position. At that time the cam 85 has turned until the crest 98 of the cam groove has reached the roller 83 on the arm 82 (Fig. 3). The roller now very quickly rides down the cam groove to the point 99 which through the levers 80, 82 and links 79 moves the slide in quickly toward the fingers, the pusher 78 forcing the lowest biscuit 74 forwardly with it and the inclined face of the spreader 76 engaging under the pin 62 and raising it so that the biscuit is pushed in between the lower pins 61 and the upper pin 62 as shown in dotted lines in Fig. 7. As the pins now continue their upward movement with the chain, the upper pin is carried away from the inclined end of the spreader and the pins 61 pass up through the slots 96, 97 in the sliding head carrying the biscuit with them. The cam groove 84 is concentric from the lowest point 99 to approximately the point 100 during which period the sliding head remains stationary and the fingers 61 are picking up and carrying away the biscuit that has just been fed between the fingers. As the fingers 61 come up, the finger 62 springs down by reason of its resilience until it comes to rest upon the top of the biscuit which is then held firmly, yet gently, between the two lower fingers and the upper finger. As soon as the cam is turned far enough for the roller to reach the point 100, the further rotation of the cam retracts the roller 83 until it reaches about the point 101 of the cam groove at which time the sliding head is retracted to the full line position shown in Fig. 6. As the pusher 78 moves back from under the stack of biscuit, the lowest one again drops into the space between the pusher and the spreader 76. From the point 101 around to the point 98 the cam groove 80 is concentric and the sliding head 75 remains stationary. The operation of inward and outward strokes of the sliding head to feed a biscuit comprises approximately one-half of the rotation of the cam 85 or one-half of the time that it takes the chain 25 to travel the distance between two consecutive bars 60. It will be noted that the two long fingers 61 are beneath or at the rear of the biscuit and should the biscuit encounter any resistance, these two long fingers will press or urge it forward.

*Dipping tank*

Figure 12:
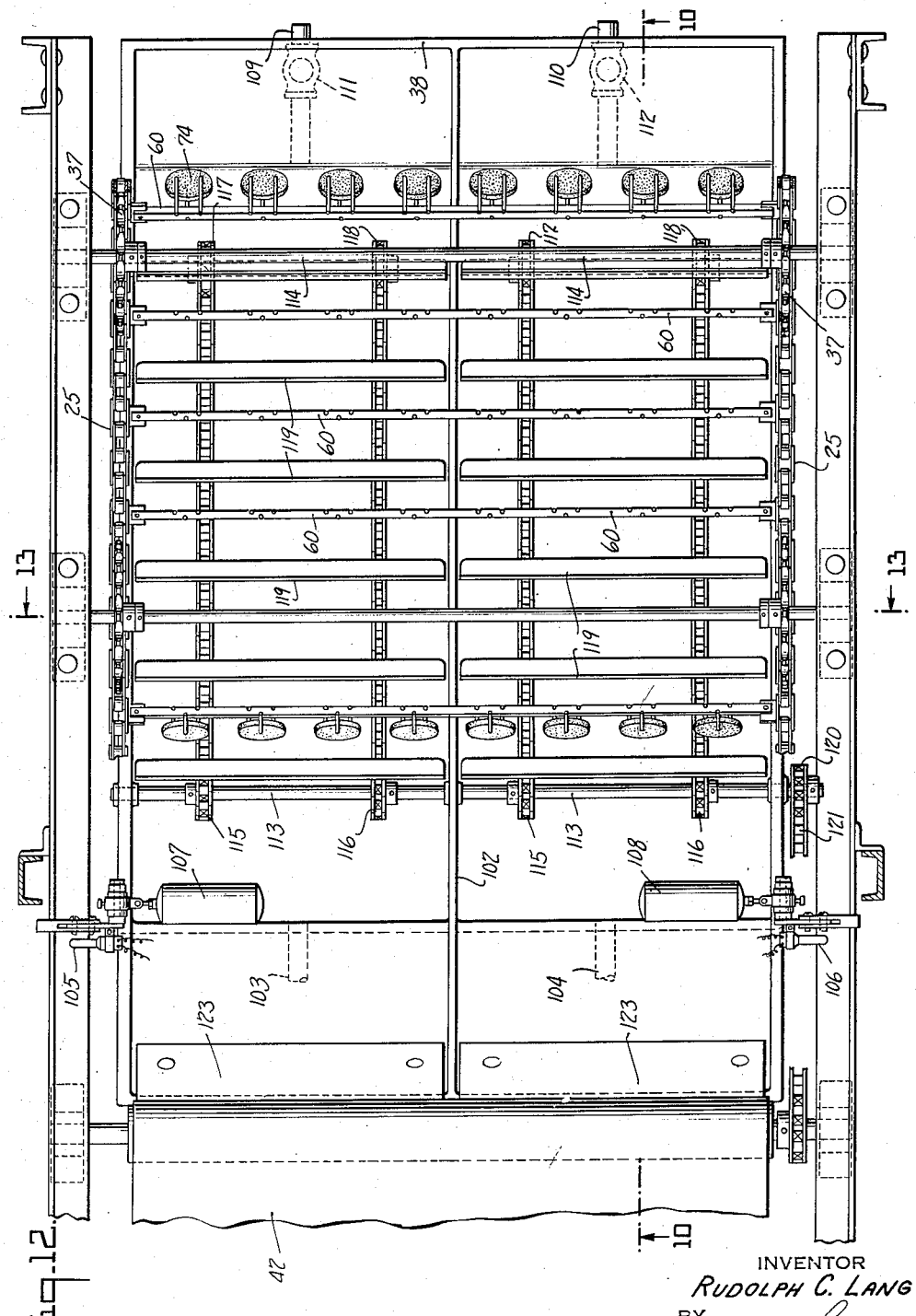
Fig. 12 is a top plan of the icing tank shown in Fig. 10.

The tank containing the coating material into which the articles are dipped is best shown in Figs. 10 and 12. The tank 38 may be a single tank but preferably is divided by a partition 102 into two compartments each of which is supplied with coating material through an inlet pipe 103, 104 to which the coating material is supplied by electrically driven pumps which are controlled by the mercury switches 105, 106 that are connected to arms adapted to be tilted by the rise and fall of the floats 107, 108 that float on the coating material in the compartments of the tank. Each of the compartments is also provided with a drain pipe 109, 110 controlled by valve 111, 112. The two compartments of the tank are similar and the further description will be limited to one compartment or a single tank.

The pair of shafts 113, 114 are supported in bearings in the sides of the tank and the shaft 113 has two sprockets 115, 116 corresponding to similar sprockets 117, 118 on the shaft 114. Endless chains pass around these pairs of sprockets and carry a number of vanes or paddles 119 which are spaced apart the same distance as the bars 60 on the chains 25. The shaft 113 has a sprocket 120 keyed to it outside of the tank which is driveen by a chain 121 from a transmission 122 that is driven from one of the differential shafts 30 (Fig. 2A). The driving connections are such that the vanes 119 are driven at the same speed as the carrier chains 25. Referring to Fig. 10, the direction of travel of the vanes 119 is from right to left on the top run and from left to right on the bottom run, the top run of the vanes is in the same direction and at the same speed as the carrier chains 25. It will be noted on inspection of the figure that the biscuit 74 which are to be iced enter between two of the vanes which propel the icing along at the same speed so that there is no pressure exerted by the icing against the forward face of the biscuit nor is there any tendency to produce a vacuum or cavity in the icing behind the biscuit. The biscuit thus travel along with the icing while they are being dipped or coated and no pressure is exerted on them. As the biscuit rise from the icing, they are lifted up almost vertically by the inclined run 39 of the chain so that while they are being lifted out there is no appreciable force exerted by the icing tending to pull off or break the biscuit.

As shown at the left of Fig. 10, the icing adhering to the biscuit tends to run to the lower edge thereof and drip off. The icing which drips off falls upon the belt 42 from which it is removed by the scraper 123 which returns it to the tank. It will be noted that because of the vanes 119, all of the material in the tank is circulating counterclockwise (looking at Fig. 10) and that the material returned by the scraper 123 will be caught by the circulating coating material and carried down to the bottom of the tank where it will be mixed with new material coming in from the pipe 103 and then carried across the bottom of the tank and up on the right hand end to the top during which travel both the old, new and returned material will all be uniformly mixed so that only coating material of uniform consistency will be in the upper portion of the tank where it comes in contact with the biscuit. This uniformity of the coating material at all times contributes to uniform coating and quality of the articles.

The lower portion of Fig. 11 shows the coated articles when they have progressed as far as the run 41 of the chain 25 (see Fig. 1). By this time drip from the lower edge of the crackers has ceased and the material has thickened slightly at the lower edges so as to form short knobs or tails 124. The de-tailing roller 43 or 44 (as the case may be) now comes in to operation to wipe off this excess material and drop it upon the belt 42 which returns it to the tank. These de-tailing rollers or wipers are adjustable with respect to the distance from the tank at which they will remove the excess material and are also adjustable toward and from the carrier chains so as to operate with biscuit of different dimensions. But for each particular size of article and kind of coating material, the de-tailers remain fixed after their initial adjustment. As shown in the drawings, the roller 43 is located in such a position as would be used for wiping off excess chocolate material from the biscuit while the roller 44 is located in approximately the proper position for wiping off excess water icing or other coating material that sets less quickly than chocolate. As a rule the chocolate coating material begins to set more quickly than does water icing so it is necessary that chocolate iced articles be de-tailed sooner after being dipped than is the case with iced biscuit. The de-tailing rollers 43, 44 are mounted upon shafts having sprockets 125, 126 which are driven by an endless chain 127 from a drive sprocket 128 which may be connected to be driven from some part of the driving mechanism for the carrier chains or it may be driven and preferably is driven by an indepenednt motor since the speed of rotation of the rollers 43, 44 need not bear any definite relation to the speed of the carrier chains. The upper surface of the rollers which wipe off the excess material rotate counter to the direction of travel of the carrier chains.

In the form of device illustrated with the divided tank 38, different kinds of coating material may be used in the two compartments, thus one compartment may be filled with chocolate coating and one with icing or other coating material in which case the same or different kinds of biscuit may be coated with different materials. In such case, both of the rollers 43, 44 will be utilized, one being adjusted to remove the tails from the chocolate coated biscuit a short distance from the dipping tank and the other one, as 44, being adjusted to remove the tails from the iced or other coated biscuit at a point more distant from the dipping tank.

The two rollers, 43, 44, are carried by adjustable heads 129, 130 which also have idler sprockets 131 and 132 respectively for engaging the chain 127. The adjustable heads 129, 130 have screw threaded extensions 133, 134 which are adjustable in sliding blocks 135, 136 that may be adjusted longitudinally of the carrier chains as clearly shown in Fig. 11. The idler sprockets 131, 132 on the heads 129, 130 permit the heads to be adjusted both vertically and laterally without materially changing the tension of the driving chain 127. Figs. 13 and 14 show the mounting and operation of the de-tailing rollers at right angles to that shown in Fig. 11.

These loading, dipping and de-tailing means, jointly and severally, are important features of the invention. Heretofore, the biscuit to be iced were placed on the prongs only by hand and they could not be accurately aligned, that is, the biscuit were pushed on the prongs to various distances. This prevented automatic dipping unless the entire bar were dipped, otherwise some of the biscuit would be only partly coated. Also, the mal-alignment of the biscuit made it impossible to wipe off or de-tail the excess coating that collects at the bottom of each biscuit. With the present invention, all biscuit are inserted exactly the same distance between the pins. The biscuit being in exact alignment and an accurate level maintained in the dipping tank, only the biscuit and ends of the pins holding them are dipped. There is no dipping of the bars. This effects a considerable economy in coating material since all coating material on the pins above the biscuit and on the bars is wasted. The bottoms of the biscuit being in exact alignment after being dipped will for each size always pass an exact distance from the de-tailing rollers so that excess coating may be wiped off and returned to the tank, thereby effecting a further economy in icing material.

*Unloader or take-off*

The unloader indicated generally by the number 53 in Fig. 1 is illustrated in detail in Figs. 19 to 21. The downward run of the chain 25 passes around a pair of sprockets 137 which are keyed to a shaft 138 mounted in bearings on the lower part of the fixed frame. The shaft 138 carries a gear 139 which meshes with a gear 140 that is keyed to a shaft 141 carrying a pair of sprockets 142 around which a pair of endless chains 143 pass. These chains 143 carry stripper bars 144 which are spaced apart the same distance as the icing bars 60. The gears 139, 140 are of the same size as are also the sprockets 137, 142 so that chain 143 and its stripper bars travel at the same speed as the chains 25 and icing bars 60. The upward run of the carrier chains from the sprocket 137 passes between vertical guides 145 and the upward run of the chain 143 passes between similar guides 146 which are inclined upward away from the guides 145. The upward run of the chain 143 is adjacent the upward run of the chain 25 and the two are at their closest approach at the lower ends of the runs and diverge gradually toward the top of the run of the chain 143.

Each of the stripper bars 144 carries sets of stripper fingers 147 which have upwardly bent outer ends carrying pads or cushions 148. These stripper fingers are spaced on bars 144 so as to come between the biscuit holding pins or fingers 61, 62 on the carrier chain 25 as clearly shown in Fig. 21. Directly opposite the stripper fingers 147 on the bars 144 are transfer fingers 149 having their ends 140 bent downwardly or opposite to the ends of the stripper fingers 147.

Refer now to Fig. 19 and assume that the carrier chain 25 passing around the sprocket 137 has its pins loaded with iced biscuit. As the chain starts on its upward run the stripper fingers 147 will come beneath the iced biscuit and the cushions 148 will engage between the biscuit and the icing bars 60. As the chains then continue their upward movement and diverge, the cushions 148 will press on the rear edge of the iced biscuit and gradually pull them out from between the pins 61, 62 until, as they approach the top of the run of the chain 143, the biscuit are entirely free from the icing pins and are now supported entirely by the stripping fingers on the bars 144.

At the top of the run, the chains 143 pass over sprockets 151 mounted on a shaft 152. This shaft carries a rotating transfer chute 153 between the sprockets which rotates in timed relation therewith and so that its ends come in alignment with two adjacent stripper bars 144. The purpose of these chutes is to transfer the iced biscuit from the stripper fingers 147 to the transfer fingers 149 of the next bar in advance while the bars are going around the sprockets 151. The manner in which this is accomplished is clearly illustrated in Fig. 20. When the fingers 147 holding the iced biscuit 74 at the top in that figure reach the dotted line position, the biscuit will slide inwardly from the stripper fingers across the transfer chute 153 and onto the transfer fingers 149 on the opposite side of the sprocket. These transfer fingers will catch the biscuit and carry them down on the downward run of the chain 143 until they come to the comb 154, which has a number of spaced prongs or teeth 155 between which the transfer fingers 149 pass, depositing the iced biscuit on the comb fingers down which they slide to the conveyor 156 which carries the biscuit away to the packing table or stacking machine.

This unloader serves its greatest usefulness in combination with the loading, dipping and de-tailing mechanisms making a completely automatic machine possible. Because of the accurate placing and aligning of the articles on the holding pins, the stripper fingers will always engage uniformly behind the articles to remove them from the carrier chains.

In Figs. 22 and 23, I illustrate two typical biscuit which have been iced on my machine. It will be noticed that the wires or holding fingers 61, 62 are not inserted in the biscuit and when the biscuit are removed only small holes or openings 157 are left in the icing. In former icing machines where the biscuit are impaled on wire prongs, parts of the biscuit frequently adhere so tightly that they break off and carry large pieces of the icing with them when the iced goods are removed. This makes defective articles which deteriorate very quickly and must be scrapped or disposed of at a price below that of perfect merchandise.

Washing and sterilizing mechanism

The mechanism for washing and sterilizing the icing bars and pins that is indicated generally at 55 in Fig. 1 is shown in detail in Figs. 17 and 18.

The downward run of the chains 25 after the biscuit have been removed pass over a pair of sprockets 158 secured to a shaft 159 that is mounted in bearings near the bottom of a tank 160 which is adapted to be filled with hot water up to such a point that the pins or fingers will tip into it on the lower side of the sprockets 158. In addition to the hot water in the bottom of the tank, there is a steam inlet 161 in the bottom of the tank through which steam may be injected to keep the water hot and agitated so as to thoroughly wash and sterilize the pins. Also steam pipes 162, 163 are provided above the sprockets between the two runs of the chains that have orifices which direct jets of steam outwardly onto the bars and pins both before and after they enter the water at the bottom of the tank. Above the tank there is a steam jacket 164 which extends upwardly to embrace the entire vertical runs of the chains at this point and has a laterally extending hood 165 (Fig. 2A) through which the chain passes on a part of its horizontal run from the unloading point. This hood and jacket are kept filled with steam which softens and loosens any icing that may cling to the pins before they enter the wash at the bottom of the tank 160. When the chains and bars emerge from the top of the jacket they are thoroughly cleaned, sterilized and are hot. They then pass across and down to the loading device and because of their residual heat, dry completely before they reach the loading point. Since the hood and jacket must be open at the points where the chains enter and leave, an exhaust system or stack is provided to draw off the steam and prevent its escaping through these openings into the icing room.

Chain supports

The horizontal runs of the chain as shown in Figs. 1, 2A and 2B are very close together in order to economize space. Therefore they cannot be permitted to sag but must be kept accurately in their runs. In order to prevent their sagging, I provide adjustable rails or guide bars under each horizontal run of the chain on which the chain rollers are adapted to run. One set of these bars is shown in detail in Figs. 24 and 25. Preferably the bars are arranged in pairs connected together. The distance between the tops of the two bars on which the chains run being substantially equal to the pitch diameters of the sprockets around which the chains pass. These rails or tracks are arranged so that they are very slightly below the chains as they leave the sprockets so that the chains have to sag very slightly before the rollers bear upon the rails. By thus having the rails slightly below the point at which the chains leave the sprockets, the rails may be straight throughout their lengths and the rollers will not strike the ends of the rails but will first engage them as at points 166, a short distance from the ends. In Figs. 24 and 25, I show a pair of connected rails 167, 168 for supporting adjacent upper and lower runs of the chains which are connected together as a unit by the brackets 169, 170 and are adjustable as a unit to and from the chains on the frame member 171, and are individually adjustable on the brackets.

As shown in Fig. 10, the blade 123 scrapes the material from the apron 42 and returns it to tank 38. In order to keep the apron clean, I provide the washing roller 172 which runs in contact with a transfer roller 173 that dips into water tank 174 and carries water up to the roller 172, which in turn spreads the water over the under surface of the lower run of the apron. A scraper or doctor blade 175 removes the semifluid watery-material from the roller 172. The rollers 172 and 173 are driven from the apron 42. A duplicate apron cleaner is provided for apron 42' as indicated at 174' in Fig. 23.

My invention, one embodiment of which is herein illustrated and described, has many advantages over coating and icing machines heretofore used among which are economy in coating material, uniform covering of the articles, less time required to harden or dry the coating because of its uniform thickness, elimination of hand work, no holes in the articles, no articles lost or broken by impaling them on the pins, no articles are lost by slipping off from the pins in the coating material, there are no "cripples" caused by breaking the biscuit and icing when removing them from the pins, two varieties of articles and two kinds of coating material may be used at the same time, short, brittle and crisp cakes and biscuit may be held by the pins and iced without breakage, the coated articles are without tails or knobs of the coating material, and the cost of production is much lower. The invention has many other advantages that will be apparent to those skilled in this art.

It will be understood that, while I have illustrated and described but one form of my invention and have used specific terms in describing and claiming it, the terms used are but illustrative of and not limitations on the invention. For example, the chains may be belts; the bars 60 may be of any form adapted to support the article holding means; the pins 61, 62 may be hinged fingers, flat springs, or other shapes; the coating may be accomplished by other means, as spraying; and other parts of the apparatus may be replaced by equivalents.

While I have shown my invention in a complete automatic machine, it includes many new and useful co-operating subcombinations and parts, all of which I claim together with all modifications and adaptations thereof that come within the spirit or scope of my claims.

What I claim is:

1. In combination a travelling carrier having a substantially horizontal run, icing bars fixedly supported on said carrier and each having a plurality of sets of pins adapted to grip and hold between them articles to be coated, said pins extending from the bar at right angles to its direction of travel, means for inserting an article to be coated between the pins of each set, means for coating the articles held by the pins, a roller fixed in the path of travel of the coated articles on the said horizontal run adapted to engage and wipe off the excess coating material that collects at the lower edges of the articles, and means for rotating the roller so that its upper surface moves counter to the direction of travel of the articles.

2. In a coating machine, the combination of parallel endless chains, sprockets for supporting and driving said chains in a plurality of upper and lower horizontal runs, icing bars fixed at opposite ends to said chains and travelling therewith, said bars being parallel and spaced apart, article holding pins fixed to said bars to project outwardly therefrom, whereby said pins extend downwardly on the lower runs and upwardly on the upper runs of said chains, a dipping tank beneath one of said lower runs for coating material into which said pins are adapted to extend and immerse the articles carried thereby, an endless propeller mounted in said dipping tank parallel to said lower runs and immersed in the coating material, means for driving said propeller at the same speed as said endless chains and its upper run in the same direction as the adjacent lower run of the chains, spaced vanes on said propeller parallel to and spaced apart the same distance as said icing bars, said vanes being arranged so that the article carrying fingers of the respective bars will enter between adjacent vanes on the upper run of the propeller.

3. In a coating machine, the combination of parallel endless chains, sprockets for supporting and driving said chains in a plurality of upper and lower horizontal runs, icing bars fixed at opposite ends to said chains and travelling therewith, said bars being parallel and spaced apart, article holding pins fixed to said bars to project outwardly therefrom, whereby said pins extend downwardly on the lower runs and upwardly on the upper runs of said chains, a dipping tank beneath one of said lower runs for coating material into which said pins are adapted to extend and immerse the articles carried thereby, an endless propeller mounted in said dipping tank parallel to said lower runs and immersed in the coating material, means for driving said propeller at the same speed as said endless chains and its upper run in the same direction as the adjacent lower run of the chains, spaced vanes on said propeller parallel to and spaced apart the same distance as said icing bars, said vanes being arranged so that the article carrying fingers of the respective bars will enter between adjacent vanes on the upper run of the propeller, means for removing excess coating material from the lower edges of the articles after they leave the tank, and means for returning said excess material to the tank.

4. In a coating machine, the combination of parallel endless chains, sprockets for supporting and driving said chains in a plurality of upper and lower horizontal runs, icing bars fixed at opposite ends to said chains and travelling therewith, said bars being parallel and spaced apart, article holding pins fixed to said bars to project outwardly perpendicular to their line of travel, whereby said pins extend downwardly on the lower runs and upwardly on the upper runs of said chains, a dipping tank beneath one of said lower runs for coating material into which said pins are adapted to extend and immerse the articles carried thereby, means fixed in the path of the travel of the coated articles on said one lower run after leaving the dipping tank adapted to engage and wipe off the excess coating material collected at the lower edges of the articles, said sprockets and chains thereafter operating to turn said articles on alternate upper and lower runs to reverse the direction of flow of the coating material over the surface of the dipped articles.

5. In a coating machine the combination of parallel endless chains, sprockets for supporting and driving said chains in a plurality of upper and lower horizontal runs, icing bars fixed at opposite ends to said chains and travelling therewith, said bars being parallel and spaced apart, article holding pins fixed to said bars to project outwardly therefrom, whereby said pins extend downwardly on the lower runs and upwardly on the upper runs of said chains, a dipping tank beneath one of said lower runs for coating material into which said pins are adapted to extend and immerse the articles carried thereby, means located in said tank for causing the upper part of the coating material to flow in the same direction and at substantially the same speed as the articles that are dipped into it and the material at the bottom to flow in the opposite direction, means for removing excess coating material from the lower edges of the articles after they leave the tank, means for returning said excess material to the tank and blending it with the coating material flowing along the bottom.

6. In a coating machine, the combination of a tank for coating material, a conveyor chain carrying downwardly extending pins adapted to dip into said tank, supply means for maintaining the coating material in the tank at a level such that the pins will dip therein, an endless propeller in said tank for circulating said coating material and having upper and lower horizontal runs submerged therein, means for driving the propeller and chain at the same speeds and the upper run of the propeller in the same direction as the chain.

7. In a coating machine, the combination of a tank for coating material, a conveyor chain carrying downwardly extending pins adapted to dip into said tank, supply means for maintaining the coating material in the tank at a level such that the pins will dip therein, an endless propeller in said tank having upper and lower runs submerged in the coating material, means for driving the propeller and chain at the same speeds and the upper run of the propeller in the same direction as the chain, vanes on said propeller spaced apart the same distance as the pins on said chain, said chain and propeller being arranged so that the pins will enter the coating material between the vanes.

8. In a coating machine, the combination of a tank for coating material, a conveyor chain carrying downwardly extending pins adapted to dip into said tank, supply means for maintaining the coating material in the tank at a level such that the pins will dip therein, an endless propeller in said tank having upper and lower runs submerged in the coating material, means for driving the propeller and chain at the same speeds and the upper run of the propeller in the same direction as the chain, vanes on said propeller spaced apart the same distance as the pins on said chain, said chain and propeller being arranged so that the pins will enter the coating material between the vanes, means for returning excess coating material to the tank at the exit end thereof, whereby the returned material will be carried down and along the bottom of the tank to blend with other material therein before reaching the upper run of the propeller.

9. In a coating machine, the combination of a tank for coating material, a conveyor chain carrying downwardly extending pins adapted to dip into said tank, supply means for maintaining the coating material in the tank at a level such that the pins will dip therein, an endless propeller in said tank having upper and lower runs submerged in the coating material, means for driving the propeller and chain at the same speeds and the upper run of the propeller in the same direction as the chain, vanes on said propeller spaced apart the same distance as the pins on said chain, said chain and propeller being arranged so that the pins will enter the coating material between the vanes at one end of its upper run and leave the coating material at the other end, said supply means being located adjacent the end of the propeller where the pins leave whereby new material as it is supplied will be carried down and along the bottom of the tank and blended with other material therein before reaching said upper run.

10. In a coating machine, the combination of parallel endless chains, sprockets for supporting and driving said chains, icing bars fixed at opposite ends to said chains and spaced apart in parallel relation, article holding pins fixed at one end to said bars and arranged in spaced sets of three, two pins of each set being on one side of the bars and the other pin being on the opposite side of the bars and between the two pins of the set, said pins projecting outwardly from the bars on one side, a holder for articles to be coated past which said pins travel, means operating to insert an article from the holder between the pins of each set as they pass the holder with the two pins of each set on the rear side of the article with respect to the direction of travel, the single pin of each set being shorter than the other two pins, and the pins converging toward their free ends.

11. In a coating machine, the combination of parallel endless chains, sprockets for supporting and driving said chains, icing bars fixed at opposite ends to said chains and spaced apart in parallel relation, article holding pins fixed at one end to said bars and arranged in spaced sets of three, two pins of each set being on one side of the bars and the other pin being on the opposite side of the bars and between the two pins of the set, said pins projecting outwardly from the bars on one side and converging toward their free ends, a holder for articles to be coated adjacent which the free ends of the pins pass, a spreader operated in timed relation to the travel of the pins to engage the said other pin of each set and spring it away from the two pins as they come adjacent to the holder, and means for inserting an article from the holder between the pins of each set while the said other pin is sprung.

12. In a coating machine, the combination of an endless carrier having spaced sets of pins adapted to hold the articles to be coated, means for driving the carrier, a loading device adjacent which said pins pass comprising a vertical chute adapted to hold a stack of the articles to be coated, a sliding head adjacent the lower end of the chute and slidable transversely thereof toward and from said pins as they pass the loading device, a pusher attached to the rear end of said head and a spreader at the forward end thereof, said head being adapted to receive the bottom article from the stack between the pusher and spreader, the pusher being of less thickness than the article, means for advancing the sliding head toward each set of pins as it approaches whereby the spreader will engage one of the pins and spring it away from the others of the set so that the article may be inserted by the pusher between the spread pins, said spreader being of less width than the distance between the unsprung pins of the set whereby said unsprung pins will lift the article away from said sliding head as the carrier continues its movement, and means for retracting the head.

13. In a coating machine, the combination of an endless carrier having spaced sets of pins adapted to hold the articles to be coated, means for driving the carrier, a loading device adjacent which said pins pass comprising a vertical chute adapted to hold a stack of the articles to be coated, a sliding head adjacent the lower end of the chute and slidable transversely thereof toward and from said pins as they pass the loading device, a pusher attached to the rear end of said head and a spreader at the forward end thereof, said head being adapted to receive the bottom article from the stack between the pusher and spreader, the pusher being of less thickness than the article, means for advancing the sliding head toward each set of pins as it approaches whereby the spreader will engage one of the pins and spring it away from the others of the set so that the article may be inserted by the pusher between the spread pins, said spreader being of less width than the distance between the unsprung pins of the set whereby said unsprung pins will lift the article away from said sliding head as the carrier continues its movement, means for retracting the head, and means for adjusting the space between the pusher and spreader to receive articles of different size.

14. In a coating machine, the combination of an endless carrier having spaced sets of pins adapted to hold the articles to be coated, means for driving the carrier, a loading device adjacent which said pins pass comprising a vertical chute adapted to hold a stack of the articles to be coated, a sliding head adjacent the lower end of the chute and slidable transversely thereof toward and from said pins as they pass the loading device, a pusher attached to the rear end of said head and a spreader at the forward end thereof, said head being adapted to receive the bottom article from the stack between the pusher and spreader, the pusher being of less thickness than the article, means for advancing the sliding head toward each set of pins as it approaches whereby the spreader will engage one of the pins and spring it away from the others of the set so that the article may be inserted by the pusher between the spread pins, said spreader being of less width than the distance between the unsprung pins of the set whereby said unsprung pins will lift the article away from said sliding head as the carrier continues its movement, means for retracting the head, and means for adjusting the distance at which the carrier and pins pass the loading device to vary the distance that the articles are inserted between the pins.

15. In a coating machine, the combination of an endless carrier having spaced sets of pins adapted to hold the articles to be coated, means for driving the carrier, a loading device adjacent which said pins pass comprising a vertical chute adapted to hold a stack of the articles to be coated, a sliding head adjacent the lower end of the chute and slidable transversely thereof toward and from said pins as they pass the loading device, a pusher attached to the rear end of said head and a spreader at the forward end thereof, said head being adapted to receive the bottom article from the stack between the pusher and spreader, the pusher being of less thickness than the article, means for advancing the sliding head toward each set of pins as it approaches whereby the spreader will engage one of the pins and spring it away from the others of the set so that the article may be inserted by the pusher between the spread pins, said spreader being of less width than the distance between the unsprung pins of the set whereby said unsprung pins will lift the article away from said sliding head as the carrier continues its movement, means for retracting the head, and means for adjusting the delivery end of the chute with respect to the sliding head.

16. In a loading device for a coating machine, the combination of a chute for a stack of the articles to be coated, a sliding head below the open lower end of the chute adapted to receive the lower article from the stack, a pusher on said head in the rear of the article thereon, a spreader on the said head in advance of the article thereon, a carrier having a vertical run adjacent said chute, article holding devices in spaced relation on said carrier and extending toward said spreader, means for driving said carrier, and means for reciprocating said head toward and from said holding devices in timed relation thereto whereby the spreader will open said devices and said pusher will deliver an article thereto.

17. In an article feeding device the combination of a vertical chute adapted to receive a stack of articles, a reciprocating slide beneath the chute, a spreader at the forward end of the slide and a pusher at the rear end thereof, the slide being adapted to receive the bottom article from the chute between the pusher and spreader.

18. In an article feeding device, the combination of a vertical chute adapted to receive a stack of articles, a reciprocating slide beneath the chute, a spreader at the forward end of the slide and a pusher at the rear end thereof, the slide being adapted to receive the bottom article from the chute between the pusher and spreader, the spreader being narrower than the slide and the latter having a slot on each side of the spreader.

19. In an article feeding device, the combination of an endless carrier having sets of three article holding pins spaced apart thereon, means for driving the carrier, a chute adapted to receive a vertical stack of articles, said carrier having a vertical run adjacent said chute, the pins when on said vertical run being arranged on the carrier to extend toward the chute with one pin of each set above and between the other two, a slide below the chute and movable horizontally toward and from said carrier, a spreader on the forward side of said slide adapted to raise the upper pin of each set as it approaches the chute, said spreader being narrower than the space between the two lower pins, and said slide having a slot on each side of the spreader through which said two lower pins are adapted to pass.

20. In a coating machine, the combination of parallel endless chains spaced apart, means for driving said chains continuously, said chains having pairs of opposite inwardly extending lugs spaced apart, icing bars secured at their ends to each of said pairs of lugs, sets of pins secured at one end to each bar and extending outwardly at right angles to the line of travel of the chains, each set of pins including a single pin on the forward side of the bar and two pins spaced apart on the rear side of the bar, means for driving said chains, and means for inserting articles to be coated between the forward pin and rear pins of each set while said chains are being driven.

21. In a coating machine, a rectangular bar, a pair of parallel slots cut across one face thereof, a single slot cut across the opposite face thereof and inclined to said face, said three slots lying in parallel planes perpendicular to the length of the bar, and a pin secured at one end in each of said slots, the free ends of all of said pins projecting from the same side of said bar and the plane of the pin in the single slot lying between the other two.

22. In a coating machine, a rectangular bar, a pair of parallel slots cut across one face thereof, a single slot cut across the opposite face thereof and inclined to said face, said three slots lying in parallel planes perpendicular to the length of the bar, and a pin secured at one end in each of said slots, the free ends of all of said pins projecting from the same side of said bar and the plane of the pin in the single slot lying between the other two, the pin in said inclined slot converging at its free end toward the other two.

23. In a coating machine, a rectangular bar, a pair of parallel slots cut across one face thereof, a single slot cut across the opposite face thereof and inclined to said face, said three slots lying in parallel planes perpendicular to the length of the bar, and a pin secured at one end in each of said slots, the free ends of all of said pins projecting from the same side of said bar and the plane of the pin in the single slot lying between the other two, the pin in said inclined slot being shorter than the other two.

24. In a coating machine, the combination of a pair of continuously driven endless chains spaced apart, a dipping bar rigidly connected at its two ends to said chains, sets of holding fingers secured to said bar and extending outwardly from one side thereof, means for inserting an article between the holding fingers of each set with the outer edges of all the articles in alignment with said bar, means for coating said articles with fluid coating material, a wiping bar adjacent which the outer edges of the coated articles pass, and means for adjusting the wiping bar to a fixed distance from the dipping bar so that it will wipe excess material from the edges of the articles as they pass while the opening means remains in finger opening position.

25. In combination, a travelling carrier, icing bars supported on said carrier, each bar having sets of pins adapted to hold articles to be coated, means for inserting and aligning articles to be coated within the sets of pins so that the edges of all articles are the same distance from the bars, means for coating the articles held by the pins, and wiping means over which the bars pass after the articles have been coated, said wiping means being located a fixed distance from the bars, whereby excess coating material that collects on the aligned edges of the articles will be wiped off.

26. In a coating machine, the combination of an endless carrier, sprockets for supporting and driving said carrier in a plurality of vertical and horizontal runs, icing bars fixed on said carrier in spaced-apart parallel relation, sets of article holding pins fixed on said bars and extending laterally outward therefrom, the pins of each set being spaced apart laterally of the bar whereby the opposed pins of each set will grip and hold an article inserted therebetween, a loading device adjacent which the bars pass on a vertical run with the sets of pins extending horizontally toward said device, said loading device comprising means for spreading simultaneously the opposed pins of each set as each bar comes adjacent thereto and inserting an article to be coated between the pins of each set, said inserting means aligning the outer edges of the inserted articles so that they lie in a straight line parallel to the bar, a dipping tank for coating material below a run of the carrier in the direction of travel beyond the loading device, means for maintaining a constant level of material in said tank, said carrier carrying the bars over the tank with the pins extending downward and dipping the articles into the coating material, a wiper beyond the tank adjustable to a fixed distance below the aligned edges of the dipped articles whereby excess coating that flows to the lower edges of the articles will be wiped off to a uniform thickness.

27. In combination a travelling carrier having a substantially horizontal run, icing bars fixedly supported on said carrier and each having a plurality of sets of pins adapted to hold articles to be coated, said pins extending from the bar at right angles to its direction of travel, means for inserting an article to be coated between the pins of each set, means for coating the articles held by the pins, and fixed wiping means slightly below the lower edges of the articles on said horizontal run for removing excess coating material that collects at the lower edges.

28. In a coating machine, the combination of carrier chains having bars with pins carrying articles that have been coated, said chains having a vertical run, a take-off device for removing articles from said pins on said vertical run of the chains, comprising a pair of endless chains spaced apart and passing over upper and lower sprockets, the upwardly travelling run of said take-off chains being adjacent said vertical run and diverging therefrom from bottom to top, means for driving said carrier chains and take-off chains at the same speed, said take-off chains having take-off fingers adapted to engage under and back of the coated articles on the said pins at the nearest approach of said carrier and take-off chains, whereby as the take-off chains recede from the carrier chains the coated articles will be removed from the pins.

29. In a coating machine, the combination of carrier chains having bars with pins carrying articles that have been coated, said chains having a vertical run, a take-off device for removing articles from said pins on said vertical run of the chains, comprising a pair of endless chains spaced apart and passing over upper and lower sprockets, the upwardly travelling run of said take-off chains being adjacent said vertical run and diverging therefrom from bottom to top, means for driving said carrier chains and take-off chains at the same speed, said take-off chains having take-off fingers adapted to engage under and back of the coated articles on the said pins at the nearest approach of said carrier and take-off chains, whereby as the take-off chains recede from the carrier chains the coated articles will be removed from the pins, transfer fingers on the chains adjacent said take-off fingers, and means for transferring the articles from the take-off pins to the transfer pins at the top of said upward run.

30. In a coating machine, the combination of carrier chains having bars with pins carrying articles that have been coated, said chains having a vertical run, a take-off device for removing articles from said pins on said vertical run of the chains, comprising a pair of endless chains spaced apart and passing over upper and lower sprockets, the upwardly travelling run of said take-off chains being adjacent said vertical run and diverging therefrom from bottom to top, means for driving said carrier chains and take-off chains at the same speed, said take-off chains having take-off fingers adapted to engage under and back of the coated articles on the said pins at the nearest approach of said carrier and take-off chains, whereby as the take-off chains recede from the carrier chains the coated articles will be removed from the pins, transfer fingers on the chains adjacent said take-off fingers, and means for transferring the articles from the take-off pins to the transfer pins at the top of said upward run, and means adjacent the downward run of said take-off chains for removing the articles from said transfer fingers.

RUDOLPH C. LANG.